(12) United States Patent
Viola

(10) Patent No.: US 8,967,010 B2
(45) Date of Patent: Mar. 3, 2015

(54) SYSTEM AND METHOD FOR PROVIDING A SELECTABLE MULTIPLE OUTPUT MOTOR

(75) Inventor: Frank Viola, Sandy Hook, CT (US)

(73) Assignee: Covidien LP, Mansfield, MA (US)

( * ) Notice: Subject to any disclaimer, the term of this patent is extended or adjusted under 35 U.S.C. 154(b) by 341 days.

(21) Appl. No.: 13/367,415

(22) Filed: Feb. 7, 2012

(65) Prior Publication Data
US 2012/0247268 A1 Oct. 4, 2012

Related U.S. Application Data

(60) Provisional application No. 61/469,853, filed on Mar. 31, 2011.

(51) Int. Cl.
*H02K 7/116* (2006.01)
*H02K 51/00* (2006.01)
*H02K 7/12* (2006.01)

(52) U.S. Cl.
CPC .................. *H02K 7/12* (2013.01); *H02K 7/125* (2013.01); *H02K 7/116* (2013.01)
USPC .......................................... 74/421 A; 310/99

(58) Field of Classification Search
CPC ......... H02K 7/116; H02K 51/00; B25J 9/102; B25J 18/00; B25J 9/106; B25J 9/044; B25J 9/0051; B25J 9/0009; B25J 13/02
USPC ........ 74/664, 665 R, 380, 373, 421 A, 421 R, 74/470, 471 R, 490, 490.01, 490.03; 310/99, 83
See application file for complete search history.

(56) References Cited

U.S. PATENT DOCUMENTS

| | | | |
|---|---|---|---|
| 4,862,027 A | 8/1989 | Isozumi et al. | |
| 6,318,496 B1 * | 11/2001 | Koehler et al. | 180/444 |
| 6,411,001 B1 * | 6/2002 | Henderson et al. | 310/103 |
| 6,437,470 B1 * | 8/2002 | Hsu | 310/75 R |
| 6,662,686 B2 | 12/2003 | Chan | |
| 7,495,192 B2 | 2/2009 | Takahashi et al. | |
| 8,042,322 B1 * | 10/2011 | Wyatt | 56/16.9 |
| 8,640,801 B2 * | 2/2014 | Hennings et al. | 180/65.6 |
| 2002/0007691 A1 | 1/2002 | Peter | |
| 2006/0113933 A1 * | 6/2006 | Blanding et al. | 318/116 |
| 2007/0173788 A1 * | 7/2007 | Schena | 606/1 |
| 2009/0015088 A1 * | 1/2009 | Akopian et al. | 310/99 |
| 2010/0005918 A1 * | 1/2010 | Mizuno et al. | 74/490.03 |
| 2010/0206686 A1 | 8/2010 | Johnson et al. | |
| 2010/0225902 A1 * | 9/2010 | Bagley et al. | 356/237.1 |
| 2011/0233364 A1 * | 9/2011 | Breen et al. | 248/421 |

* cited by examiner

*Primary Examiner* — Ha D Ho
*Assistant Examiner* — Jude Agendia

(57) ABSTRACT

An actuation mechanism including a motor having a first motor output gear and a second motor output gear is provided, the motor defining a common axis of rotation for the first and second motor output gears. The actuation mechanism also includes a pair of gearboxes positioned on opposed ends of the motor. The actuation mechanism further includes a first arm adapted to mechanically cooperate with the first gearbox and a second arm adapted to mechanically cooperate with the second gearbox. The rotor of the motor slides along the common axis of rotation. The rotor is configured to be axially movable between a first position where the rotor engages the first gearbox to rotatably actuate the first arm and a second position where the rotor engages the second gearbox to rotatably actuate the second arm.

20 Claims, 5 Drawing Sheets

SYSTEM AND METHOD FOR PROVIDING A SELECTABLE MULTIPLE OUTPUT MOTOR

CROSS REFERENCE TO RELATED APPLICATION

The present application claims the benefit of and priority to U.S. Provisional Application Ser. No. 61/469,853, filed on Mar. 31, 2011, the entire contents of which are incorporated herein by reference.

BACKGROUND

1. Technical Field

The present disclosure relates to electric motors. More particularly, the present disclosure relates to systems and methods for providing a selectable multiple output motor for powering separate arms of a surgical robot.

2. Background of Related Art

An electric motor is typically used for converting electrical energy to mechanical energy in order to power most mechanical devices. A typical motor includes one output shaft extending from the rotor and uses a clockwise rotation or a counter-clockwise rotation of the output shaft to operate the mechanical subsystem. A gear-changing unit or transmission may be engaged with the output shaft to divert the motor rotation, alter the speed of the rotation or to power another drive train and perform more than two operations on a mechanical device. Systems have been proposed to shift the entire motor to engage different drive trains, but these require an external actuator to move the motor. However, to avoid the use of multiple motors, an actuator or transmissions a system which increases the ability to alter the drive train with a single motor is desirable.

SUMMARY

Accordingly, an actuation mechanism is provided. The actuation mechanism includes a motor having a first end with a first motor output gear and a second end with a second motor output gear, the motor defining a common axis of rotation for the first and second motor output gears supported on a common rotor. The actuation mechanism also includes a first gearbox positioned adjacent the first end of the motor and a second gearbox positioned adjacent the second end of the motor. The actuation mechanism further includes a first arm adapted to mechanically cooperate with the first gearbox via a first pivot member and a second arm adapted to mechanically cooperate with the second gearbox via a second pivot member. A housing for supporting the motor, the first and second gearboxes, and the first and second pivot members is provided. The motor include a stator, providing a magnetic field, and a rotor or armature slidably supported in the housing so as to slide along the motor axis of rotation. The rotor is configured to be axially movable between a first position where the rotor engages the first gearbox to rotatably actuate the first arm and a second position where the rotor engages the second gearbox to rotatably actuate the second arm. The rotor is moved between the two positions by varying the magnetic field of the stator.

In yet another embodiment, input and output gears are provided at opposed ends of the first gearbox and are operatively connected to one another, and second gearbox input and output gears are provided at opposed ends of the second gearbox, and are operatively connected to one another.

The rotor is slidable relative to the stator to the first position such that the first motor output gear engages one of the first gearbox input gears such that rotary motion to the first arm is enabled via the first gearbox output gear.

The rotor is slidable relative to the stator to the second position such that the second motor output gear engages the second gearbox input gear such that rotary motion to the second arm is enabled via the second gearbox output gear.

In another exemplary embodiment, the first arm is adapted to be operable with a a robotic system when the rotor and thereby the motor is engaged to the first gearbox.

In yet another exemplary embodiment, the second arm is adapted to be operable with a robotic system when the motor is engaged to the second gearbox.

Thus, a motor output redirection system is presented. The motor output redirection system includes a motor having a rotor and a stator. The motor output redirection system also includes a pair of gearboxes, each positioned adjacent opposed ends of the motor and a pair of arms, each positioned adjacent a respective gearbox. The rotor is configured to be axially movable between a first position where the rotor engages one gearbox and a second position where the rotor engages another gearbox.

Additionally, a method of redirecting a motor output is provided. The method includes providing a motor having a first end with a first motor output gear and a second end with a second motor output gear, the motor defining a common axis of rotation for the first and second motor output gears supported on a common rotor; positioning a first gearbox adjacent the first end of the motor; positioning a second gearbox adjacent the second end of the motor; mechanically associating a first arm with the first gearbox; mechanically associating a second arm with the second gearbox; supporting the motor, the first and second gearboxes, and the first and second pivot members in a housing such that the rotor of the motor slides along the common axis of rotation; and axially moving the rotor between a first position where the rotor engages the first gearbox to rotatably actuate the first arm and a second position where the rotor engages the second gearbox to rotatably actuate the second arm.

BRIEF DESCRIPTION OF THE DRAWINGS

The accompanying drawings, which are incorporated in and constitute a part of this specification, illustrate embodiments of the disclosure and, together with a general description of the disclosure given above, and the detailed description of the embodiment(s) given below, serve to explain the principles of the disclosure, wherein.

DETAILED DESCRIPTION

Figure 1:
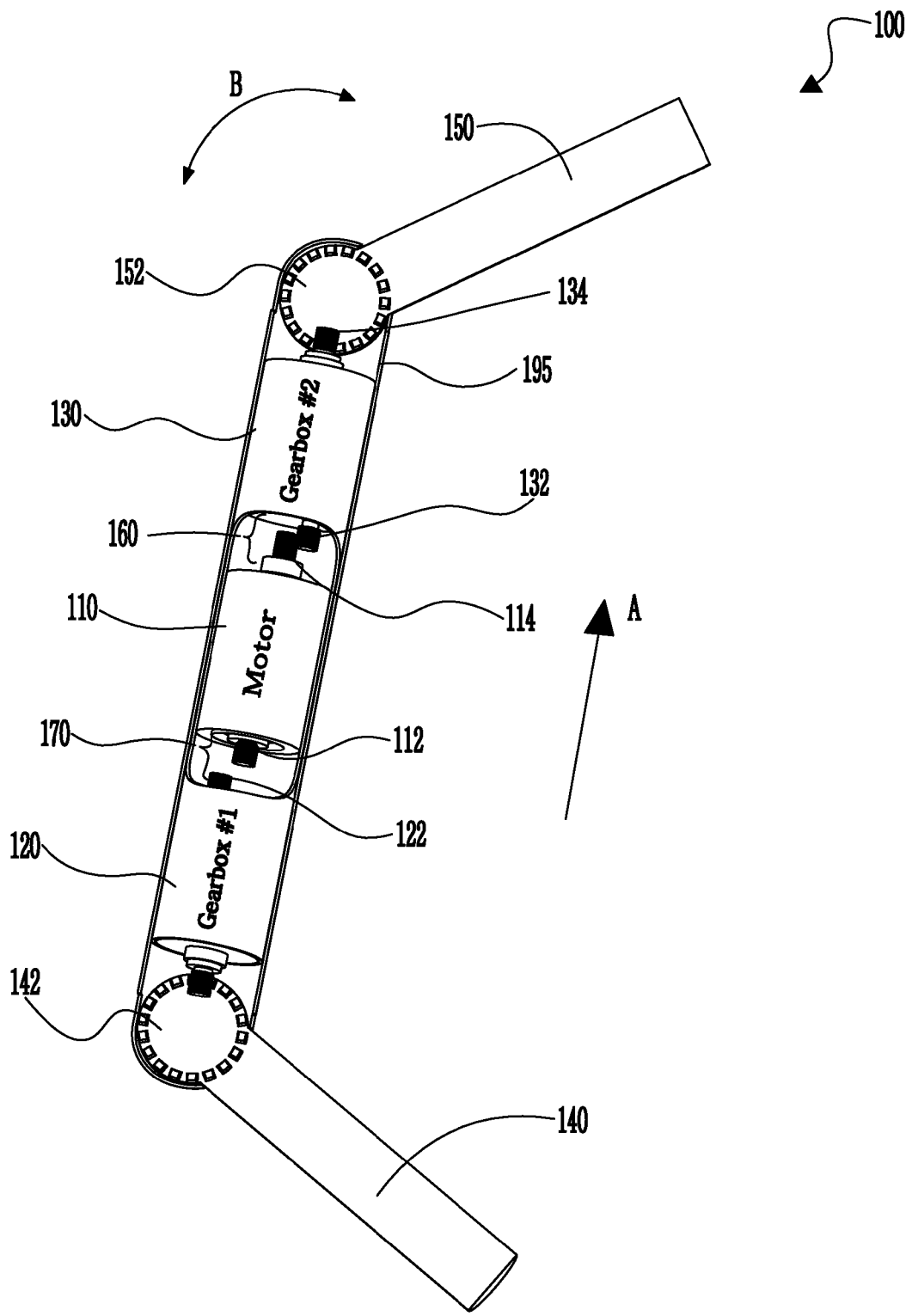
FIG. 1 illustrates a selectable multiple output motor configuration, wherein the rotor of a motor engages a second gearbox which actuates a second arm, in accordance with the present disclosure.
Figure 4A:
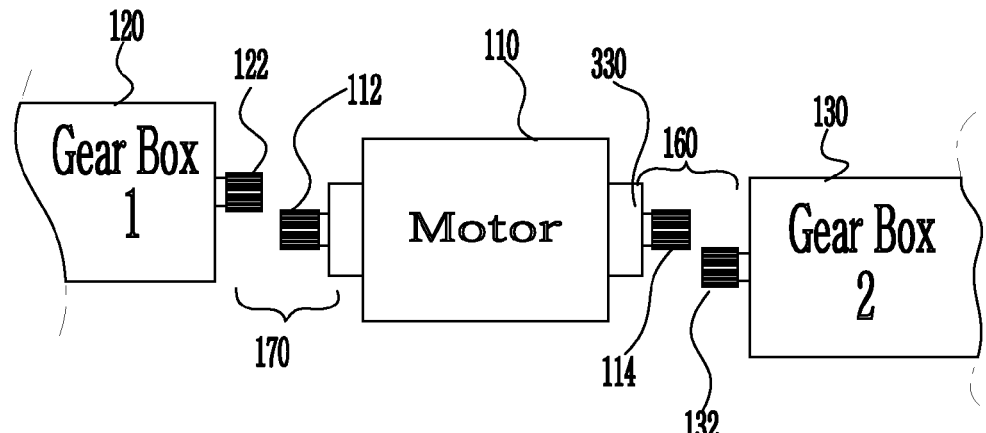
FIG. 4A illustrates, schematically, a rotor of a motor in a neutral position disengaged from a first gear box and from a second gear box.

Referring initially to FIG. 1, a selectable multiple output motor configuration is generally depicted as 100. Selectable multiple output motor configuration 100 includes a motor 110 having a first end supporting a first motor output gear 112 and a second end supporting a second motor output gear 114. Motor 110 includes a common rotor 330 (see FIG. 4A) defining a common axis of rotation. As seen in FIG. 4A, first and second motor output gears 112, 114 are supported on opposed ends of common rotor 330.

As seen in FIG. 1, first gearbox 120 is positioned adjacent the first end and the first motor output gear 112 of motor 110. Second gearbox 130 is positioned adjacent the second end and the second motor output gear 114. First gearbox input gears and output gears 122, 124 are provided at opposed ends of first gearbox 120 and are operatively connected to one another such that rotation of gear 122 may result in rotation of gear 124. Similarly, second gearbox input and output gears 132, 134 are provided at opposed ends of second gearbox 130 and are operatively connected to one another such that rotation of gear 132 may result in rotation of gear 134.

A first arm 140 is provided and adapted to mechanically cooperate with first gear box output gear 124 of first gearbox 120 via a first pivot or gear member 142. A second arm 150 is provided and adapted to mechanically cooperate with second gear box output gear 134 of second gearbox 130 via a second pivot or gear member 152. Pivoting arms, 140, 150 are schematic in nature and may represent any rotational or translational joint in a mechanical device or robot. For instance, for a translational joint gear 124 may be a pinion and gear 142 may be a rack.

Rotor 330 is configured to translate axially with respect to the fixed stator 310 of motor 110 to selectably engage first gearbox 120 and second gearbox 130 in a direction substantially parallel to the common axis of rotation using one or the other of first and second motor output gears 112, 114. First arm 140 and second arm 150 are configured to selectively move in a rotational manner upon connection of rotor 330 to respective first gear box 120 and second gear box 130 and upon actuation/activation of motor 110.

A housing 195 is provided for supporting motor 110, first gearbox 120, second gearbox 130, and first and second pivot members 142, 152. Rotor 330 is slidably supported in stator 330 of motor 110 so as to slide along an axis that is substantially parallel to the common axis of rotation. As mentioned above, motor 110 and housing 195 are configured such that rotor 330 is axially movable between a first position where rotor 330 engages first gearbox 120 to rotatably actuate first arm 140 and a second position where rotor 330 engages second gearbox 130 to rotatably actuate second arm 150.

As seen in FIG. 1, rotor 330 is shown being moved in direction "A" in order to engage and actuate second gearbox 130, which in turn actuates second arm 150 in a rotational direction "B." In particular, rotor 330 is slidable relative to motor 110 and thus stator 320 to the second position such that second motor output gear 114 engages first gearbox input gear 132 to form a connection, at 160, therewith, such that a rotary motion to second arm 150 is enabled via first gearbox output gear 134. The sliding of rotor 330 towards direction "A" also causes a disconnection, at 170, of first motor output gear 112 from first gearbox input gear 122, such that first arm 140 does not rotate due to rotor 330.

Figure 2:
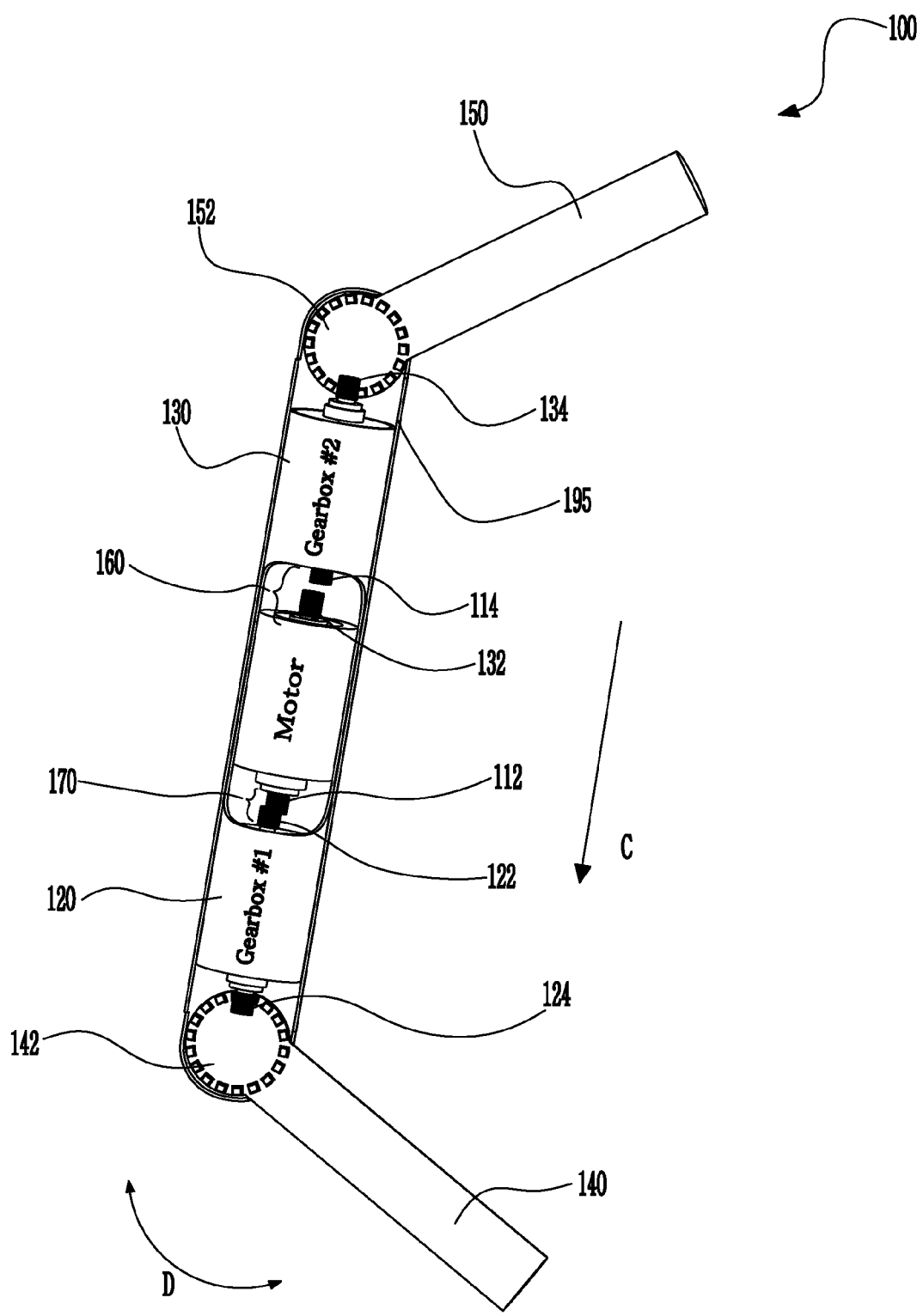
FIG. 2 illustrates the selectable multiple output motor configuration of FIG. 1, wherein the rotor of a motor engages a first gearbox actuating a first arm, in accordance with the present disclosure.

With reference to FIG. 2, selectable multiple output motor configuration 100 of FIG. 1 is shown, where rotor 330 is moved relative to motor 110 and thus stator 320, into engagement with first gearbox 120 to actuate first arm 140, in accordance with the present disclosure.

In particular, FIG. 2 illustrates rotor 330 moving in direction "C" in order to engage and actuate first gearbox 120, which in turn actuates first arm 140 in a rotational direction "D." Further, as seen in FIG. 2, rotor 330 is slidable relative to motor 110 to the first position such that first motor output gear 112 engages first gearbox input gear 122 to form a connection, at 170, therewith, such that rotary motion to first arm 140 is enabled via first gearbox output gear 124. The sliding of rotor 330 towards direction "C" also causes a disconnection of second motor output gear 114 from second gearbox input gear 132, at 160, such that second arm 150 does not rotate due to rotor 330.

Figure 3:
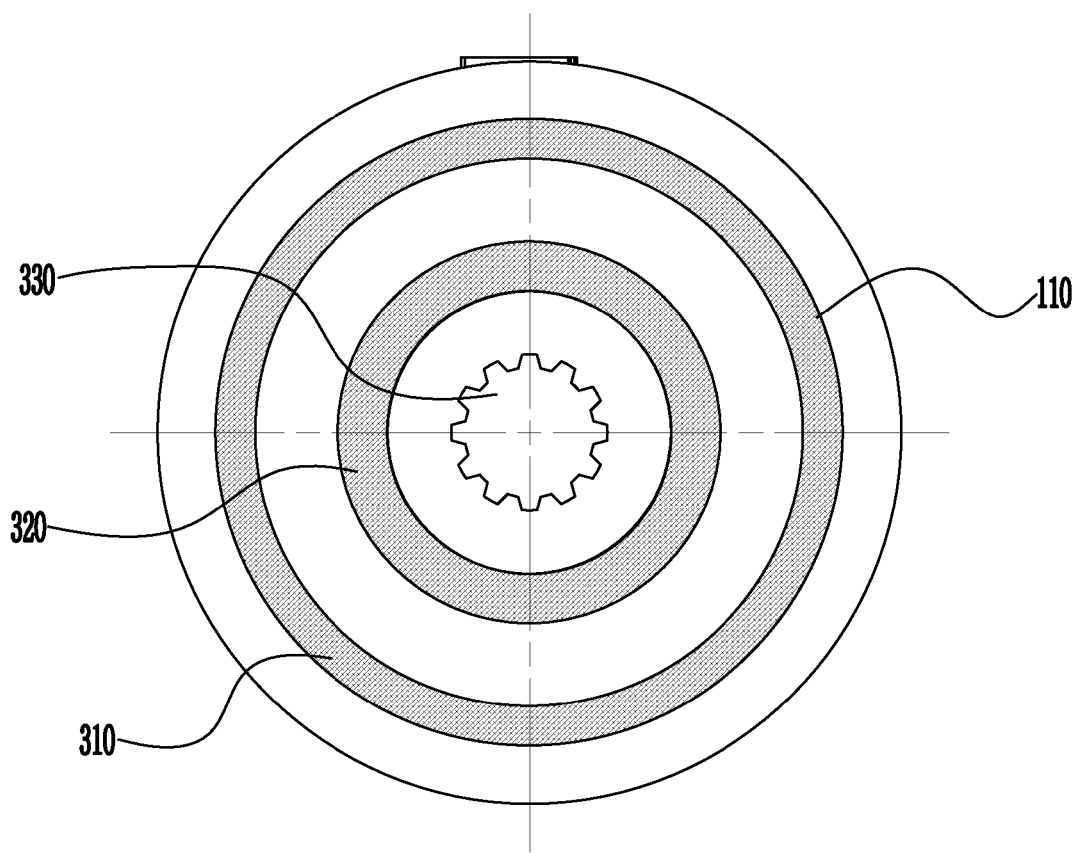
FIG. 3 is a schematic cross-sectional view of a motor configuration, in accordance with the present disclosure.

As previously discussed regarding FIGS. 1 and 2, motor 110 may include a rotor 330 and a stator 320 (as seen in FIG. 3), or may be a fluid powered motor. Rotor 330 may be shifted laterally in stator 320 by using a shifter fork with actuator or by special magnetic winding of the rotor and/or Stator that allows the rotor to be actuated laterally in the manner of a solenoid. A fluid powered motor may be either pneumatic or hydraulic. A pneumatic motor or compressed air engine is a type of motor which does mechanical work by expanding compressed air. Pneumatic motors generally convert the compressed air to mechanical work through either linear or rotary motion. Linear motion of the rotor 330 may come from either a diaphragm or piston actuator, while rotary motion may be supplied by either a vane type air motor or piston air motor. A hydraulic motor is a mechanical actuator that converts hydraulic pressure and flow into torque and angular displacement (rotation). It is contemplated that motor 110 is any type of motor including a stator 320 and a rotor 330.

As seen in cross-section in FIG. 3, motor 110 includes a stator 320 and a rotor 330. A common rotor 330 centrally extends the length of motor 110 and defines the common axis or rotation for first and second motor output gears 112, 114 (see FIGS. 1 and 2) supported on common rotor 330.

Figure 4B:
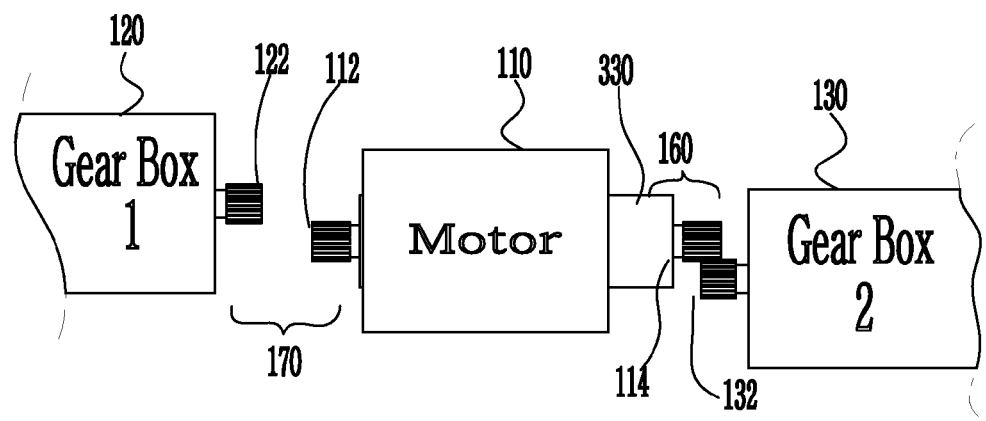
FIG. 4B illustrates, schematically, the rotor of the motor of FIG. 4A shown in a first position disengaged from the first gear box and engaged with the second gear box.
Figure 4C:
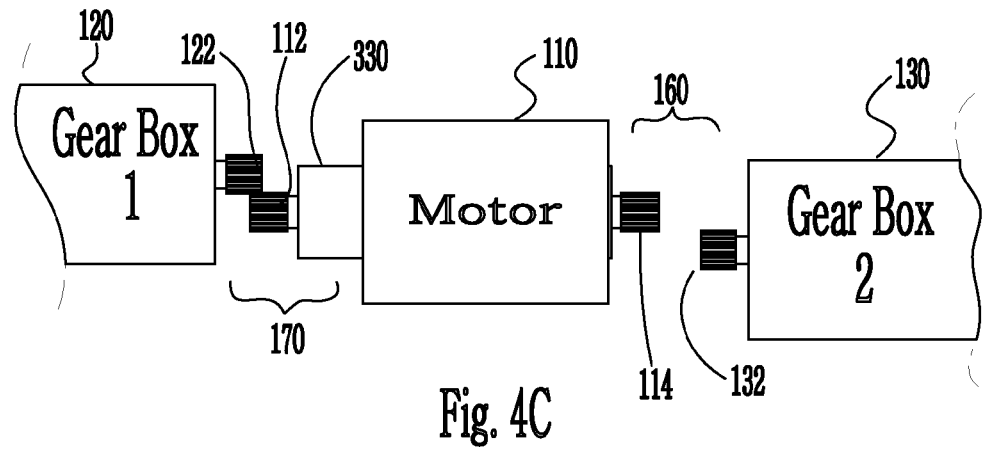
FIG. 4C illustrates, schematically, the rotor of the motor of FIG. 4A shown in a second position engaged with the first gear box and disengaged from the second gear box.

As seen in FIG. 4, rotor 330 is centrally positioned within motor 110 and centrally positioned with respect to stator 320. With rotor 330 centrally positioned, in a neutral position with respect to stator 320, rotor 330 is disengaged from first gear box 120 at 170 and from second gear box 130 at 160. In particular, first motor output gear 112 of rotor 330 is spaced from first gearbox input gear 122 of gear box 120, and second motor output gear 114 of rotor 330 is spaced from second gearbox input gear 132 of gear box 130. As seen in FIG. 4B, rotor 330 of motor 110 is shown in a first position disengaged from first gear box 120 and engaged with second gear box 130. In particular, first motor output gear 112 of rotor 330 is spaced from first gearbox input gear 122 of gear box 120, and second motor output gear 114 of rotor 330 is operatively connected with second gearbox input gear 132 of gear box 130. As seen in FIG. 4C, rotor 330 is shown in a second position engaged with first gear box 120 and disengaged from second gear box 130. In particular, first motor output gear 112 of rotor 330 is operatively connected with first gearbox input gear 122 of gear box 120, and second motor output gear 114 of rotor 330 is spaced from second gearbox input gear 132 of gear box 130.

Figure 5A:
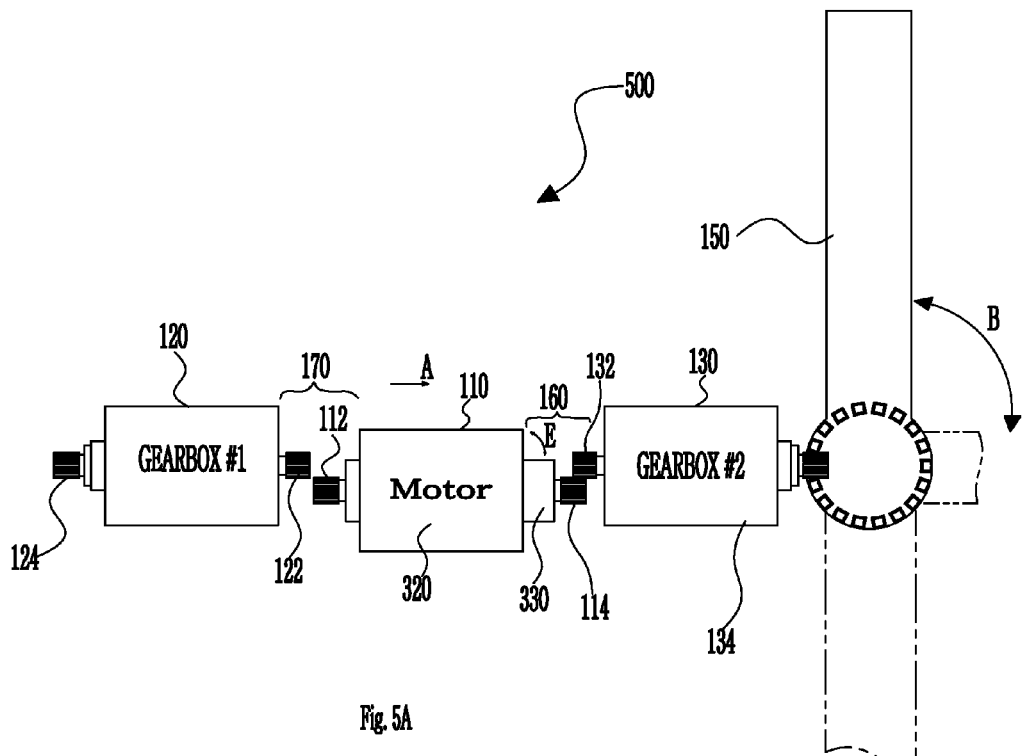
FIG. 5A illustrates, schematically, an actuation mechanism for actuating the second arm via the second gear box, in accordance with the present disclosure.

With reference to FIG. 5A, an actuation mechanism 500 for actuating second arm 150 via second gear box 130, in accordance with the present disclosure is presented.

Actuation mechanism 500 actuates second arm 150 via second gearbox 130. Actuation mechanism 500 is activated by a button or switch 510 positioned about or connected to motor 110. When a user applies a force "A" to button 510, rotor 330 is axially moved toward second gearbox 130, such that second motor output gear 114 provides a connection, at 160, to second gearbox input gear 132. When connection 160 is established, second gearbox 130 rotatably actuates arm 150 in direction "B" via first gearbox output gear 134 and second pivot pin 152.

Motor 110 may be connected to control unit 520, which includes electronics capable of providing power to motor 110. Control unit 520 may include at least one processor. As used herein, the term "processor" may be used to refer to any type of computer, processor(s), or logic which may enable movement of common rotor 330 in motor 110. Such a processor may include software for enabling activation of actuation mechanisms.

As shown in FIG. 5A, when motor 110 is connected to second gear box 130, rotor 330 is disconnected from first gearbox 120 since first motor output gear 112 is not engaged to first gearbox input gear 122 of first gearbox 120, at 170.

Figure 5B:
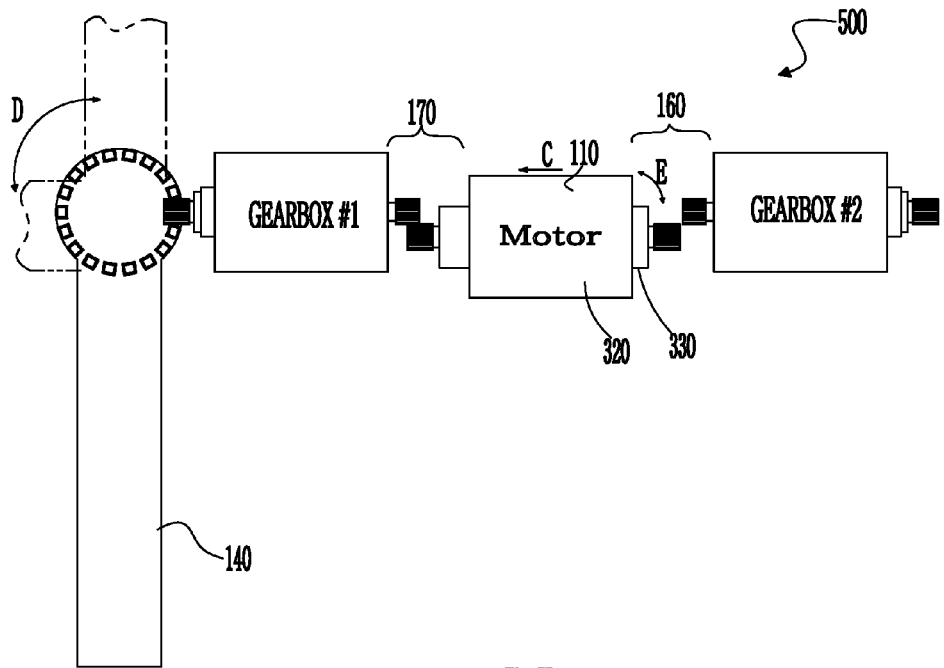
FIG. 5B illustrates, schematically, an actuation mechanism for actuating the first arm via the first gear box, in accordance with the present disclosure.

With reference to FIG. 5B, actuation mechanism 500 is shown actuating first arm 140 via first gear box 120, in accordance with the present disclosure.

Actuation mechanism 500 actuates first arm 140 via first gearbox 120. Actuation mechanism 500 is activated by a button or switch 510 positioned about or connected to motor 110. When a user applies a force "C" to button 510, rotor 330 is axially moved toward first gearbox 120, such that first motor output gear 112 provides a connection 170 to first gearbox input gear 122. When connection 170 is established, first gearbox 120 rotatably actuates arm 140 in direction "D."

As shown in FIG. 5B, when motor 110 is connected to first gear box 120, rotor 330 is disconnected from second gearbox 130 since second motor output gear 132 is not engaged to second gearbox input gear 114 of second gearbox 130, at 160.

Therefore, in accordance to FIGS. 5A and 5B, rotor 330 is configured to be axially movable between a first position where rotor 330 engages first gearbox 120 (FIG. 5B) to rotatably actuate first arm 140 and a second position where rotor 330 engages second gearbox 130 (FIG. 5A) to rotatably actuate second arm 150. As such, rotor 320 of motor 110 is capable of being axially offset along an axis of rotation thereof. By placing output gears 112, 114 at each end of common rotor 330, and placing gearboxes 120, 130 at both ends of motor 110, a user may select whichever gearbox 120, 130 the user wishes to actuate/activate first/second arm 140/150.

Such an arrangement allows motor 110 and actuation mechanism 500 to be located in a robotic system, where, for example, first gearbox 120 actuates a first robotic joint and second gearbox 130 actuates a second robotic joint.

Computer program elements of the present disclosure may be embodied in hardware and/or software (including firmware, resident software, micro-code, etc.). The computer program elements of the present disclosure may take the form of a computer program product which may be embodied by a computer-usable or computer-readable storage medium comprising computer-usable or computer-readable program instructions, "code" or a "computer program" embodied in said medium for use by or in connection with the instruction executing system. The computer program elements may be incorporated with the control unit 520 (see FIGS. 5A and 5B).

Within the context of this application, a computer-usable or computer-readable medium may be any medium which may contain, store, communicate, propagate or transport the program for use by or in connection with the instruction executing system, apparatus or device. The computer-usable or computer-readable medium may for example be, but is not limited to, an electronic, magnetic, optical, electromagnetic, infrared or semiconductor system, apparatus, device or medium of propagation, such as for example the Internet. The computer-usable or computer-readable medium could even for example be paper or another suitable medium on which the program is printed, since the program could be electronically captured, for example by optically scanning the paper or other suitable medium, and then compiled, interpreted or otherwise processed in a suitable manner. The computer program product and any software and/or hardware described here form the various means for performing the functions of the present disclosure in the example embodiment(s).

Persons skilled in the art will understand that the devices and methods specifically described herein and illustrated in the accompanying drawings are non-limiting exemplary embodiments. The features illustrated or described in connection with one exemplary embodiment may be combined with the features of other embodiments. Such modifications and variations are intended to be included within the scope of the present disclosure. As well, one skilled in the art will appreciate further features and advantages of the present disclosure based on the above-described embodiments. Accordingly, the present disclosure is not to be limited by what has been particularly shown and described, except as indicated by the appended claims.

The invention claimed is:

1. An actuation mechanism comprising:
    a single motor having a stator and a rotor within the stator, the stator having a first end with a first motor output gear and a second end with a second motor output gear, the stator defining a common axis of rotation for the first and second motor output gears supported on the rotor;
    a first gearbox positioned adjacent a first end of the motor, the first gearbox having input and output gears at opposed ends thereof;
    a second gearbox positioned adjacent a second end of the motor, the second gearbox having input and output gears at opposed ends thereof;
    a first arm adapted to mechanically cooperate with the first gearbox via a first pivot member;
    a second arm adapted to mechanically cooperate with the second gearbox via a second pivot member; and
    a housing for supporting the motor, the first and second gearboxes, and the first and second pivot members, the rotor slidably supported in the stator so as to slide along the common axis of rotation;
    wherein the rotor is configured to be axially movable between:
        a first position where the first motor output gear of the motor mechanically engages only the input gear of the first gearbox to rotatably actuate the first arm; and
        a second position where the second motor output gear of the motor mechanically engages only the input gear of the second gearbox to rotatably actuate the second arm, both mechanical engagements being offset from the common axis of rotation of the first and second motor output gears.

2. The actuation mechanism according to claim 1, wherein the motor, the first and second gearboxes, and the first and second pivot members slidably engage an inner surface of the housing.

3. The actuation mechanism according to claim 2, wherein the rotor is slidable relative to the housing to the first position such that rotary motion to the first arm is enabled via the first gearbox output gear.

4. The actuation mechanism according to claim 2, wherein the rotor is slidable relative to the housing to the second position such that rotary motion to the second arm is enabled via the second gearbox output gear.

5. The actuation mechanism according to claim 1, wherein the first arm is adapted to be operable with a robotic system when the motor is engaged to the first gearbox, whereas the second arm is adapted to be operable with the robotic system when the motor is engaged to the second gearbox.

6. The actuation mechanism according to claim 5, wherein the first arm is adapted to be operable with a first joint of the robotic system when the motor is engaged to the first gearbox, whereas the second arm is adapted to be operable with a second joint of the robotic system when the motor is engaged to the second gearbox.

7. The actuation mechanism according to claim 1, wherein the motor is a fluid powered motor.

8. The actuation mechanism according to claim 7, wherein the fluid powered motor is either pneumatic or hydraulic.

9. A motor output redirection system comprising:
a single motor having a rotor and a stator, the single motor having a pair of output gears;
a pair of gearboxes, each positioned adjacent opposed ends of the motor, each gearbox having input and output gears at opposed ends thereof; and
a pair of arms, each positioned adjacent a respective gearbox;
wherein the rotor is configured to be axially movable between:
a first position where one motor output gear mechanically engages only the input gear of one of the gearboxes; and
a second position where the other motor output gear mechanically engages only the input gear of the other gearbox, at least one of the mechanical engagements being offset from a common axis of rotation of the first and second motor output gears defined by the stator.

10. The motor output redirection system according to claim 9, wherein the system further includes a housing for supporting the motor and the pair of gearboxes.

11. The motor output redirection system according to claim 10, wherein the motor and the pair of gearboxes slidably engage an inner surface of the housing.

12. The motor output redirection system according to claim 9, wherein in the first position one gearbox rotatably actuates one arm and in the second position the other gearbox actuates the other arm.

13. The motor output redirection system according to claim 9, wherein one arm is adapted to be operable with a robotic system when the motor is engaged to one gearbox, whereas the other arm is adapted to be operable with the robotic system when the motor is engaged to the other gearbox.

14. The motor output redirection system according to claim 9, wherein the stator is internal to the rotor.

15. The motor output redirection system according to claim 9, wherein the motor is a fluid powered motor.

16. The motor output redirection system according to claim 15, wherein the fluid powered motor is either pneumatic or hydraulic.

17. A method of redirecting a motor output, the method comprising:
providing a single motor having a first end with a first motor output gear and a second end with a second motor output gear, the motor defining a common axis of rotation for the first and second motor output gears supported on a rotor;
positioning a first gearbox adjacent the first end of the motor, the first gearbox having input and output gears at opposed ends thereof;
positioning a second gearbox adjacent the second end of the motor, the second gearbox having input and output gears at opposed ends thereof;
mechanically associating a first arm with the first gearbox;
mechanically associating a second arm with the second gearbox;
supporting the motor, the first and second gearboxes, and the first and second pivot members in a housing such that the motor slides along the common axis of rotation; and
axially moving the rotor between a first position where the first motor output gear of the motor mechanically engages only the input gear of the first gearbox to rotatably actuate the first arm and a second position where the second motor output gear of the motor mechanically engages only the input gear of the second gearbox to rotatably actuate the second arm, both mechanical engagements being offset from the common axis of rotation of the first and second motor output gears.

18. The method according to claim 17, wherein rotary motion to the first arm is enabled via the first gearbox output gear.

19. The method according to claim 17, wherein rotary motion to the second arm is enabled via the second gearbox output gear.

20. The method according to claim 17, further comprising operably connecting the first arm with a robotic system when the rotor is engaged to the first gearbox; and operably connecting the second arm with the robotic system when the rotor is engaged to the second gearbox.

* * * * *